United States Patent [19]

Ikeno

[11] Patent Number: 5,306,797
[45] Date of Patent: Apr. 26, 1994

[54] ORGANOPOLYSILOXANE COMPOSITION AND ITS GEL CURED PRODUCT

[75] Inventor: Masayuki Ikeno, Annaka, Japan

[73] Assignee: Shin-Etsu Chemical Co., Ltd., Tokyo, Japan

[21] Appl. No.: 586

[22] Filed: Jan. 5, 1993

Related U.S. Application Data

[63] Continuation of Ser. No. 738,557, Jul. 31, 1991, abandoned.

[30] Foreign Application Priority Data

Aug. 1, 1990 [JP] Japan .................................. 2-204076

[51] Int. Cl.$^5$ ...................... C08G 77/06; C08G 77/12; C08G 77/20
[52] U.S. Cl. ........................................ 528/15; 528/31; 528/32
[58] Field of Search ................................ 528/31, 15, 32

[56] References Cited

U.S. PATENT DOCUMENTS

| | | | |
|---|---|---|---|
| 4,849,491 | 7/1989 | Ogawa | 528/32 |
| 4,868,063 | 9/1989 | Okamura et al. | 528/32 |
| 4,870,149 | 9/1989 | Hara et al. | 528/32 |
| 4,879,339 | 11/1989 | Yoshino et al. | 528/32 |
| 4,886,865 | 12/1989 | Ikeno et al. | 528/32 |
| 5,990,560 | 2/1991 | Ikeno et al. | 528/32 |

OTHER PUBLICATIONS

WPIL, Feb. 15, 1989, AN 88-356390, & JP-A-6-3-265956, Nov. 2, 1988.
Patent Abstracts of Japan, vol. 12, No. 248(C-511)(3095), Jul. 13, 1988, & JP-A-63-35654, Feb. 16, 1988, Y. Matsumoto, et al., "Silicone Gel Composition for Protection of Electronic Component".
WPIL, Oct. 12, 1988, AN 88-231707, & JP-A-6-3-165455, Jul. 8, 1988.
WPIL, Mar. 30, 1988, AN 88-032039, & JP-A-6-2-290754, Dec. 17, 1987.
Patent Abstracts of Japan, vol. 12, No. 182(M-703)(3029), May 27, 1988, & JP-A-62-292297, Dec. 18, 1987, A. Kurita, et al., "Solder Flux".

*Primary Examiner*—John C. Bleutge
*Assistant Examiner*—Karen A. Dean
*Attorney, Agent, or Firm*—Oblon, Spivak, McClelland, Maier & Neustadt

[57] ABSTRACT

The present organopolysiloxane composition comprises (A) an organopolysiloxane in which 5 to 30 mol % of the molecule ends is made up of an $(R^1)_3SiO_{0.5}$ unit and 95 to 70 mol % of the molecule ends is made up of at least one unit selected from the group consisting of an $R^1(R^2)_2SiO_{0.5}$ unit, an $(R^1)_2R^2SiO_{0.5}$ unit, and an $(R^2)_3SiO_{0.5}$ unit, in which units $R^1$ represent a vinyl group and $R^2$ represents a hydrocarbon group excluding aliphatic unsaturated groups, (B) an organohydrogenpolysiloxane having two or more Si—H groups in the molecule, and (C) an addition reaction catalyst. By curing this composition, a gel cured product having high resistance to poisoning by solder fluxes can be obtained.

9 Claims, No Drawings

ORGANOPOLYSILOXANE COMPOSITION AND ITS GEL CURED PRODUCT

This application is a continuation of application Ser. No. 07/738,557, filed on Jul. 31, 1991, now abandoned.

BACKGROUND OF THE INVENTION

1. Field of the Invention

The present invention relates to an addition curing type organopolysiloxane and its gel cured product high in resistance to poisoning particularly by solder fluxes.

2. Description of the Prior Art

Conventionally, various techniques are known wherein an addition reaction between an organopolysiloxane having vinyl groups bonded to silicon atoms and an organohydrogenpolysiloxane having hydrogen atoms bonded to silicon atoms in the presence of a platinum catalyst is used to obtain a gel-like resilient body (see, for example, Japanese Patent Publication (Kokoku) Nos. 38992/1980, 41705/1980, and 35932/1984 and Japanese Pre-examination Patent Publication (Kokai) Nos. 143241/1981, 39658/1987, 35655/1988, and 33475/1988.).

Addition reaction type silicone compositions from which such a silicone gel can be obtained are used in many applications, for example, for potting, coating, and encapsulation.

However, along with the recent development of electrical and electronic parts problems have arisen which are conventionally not taken into account. For example, where the above addition curing type composition is used as a protective or insulating material for IC or the like, troubles such as hampering of the curing, uncuring at the interface, and lowering of the hardness occur because of a solder flux remaining on the IC substrate. Occurrence of such troubles is noticeable and causes serious problems particularly in the case of potting materials and coating materials low in hardness.

SUMMARY OF THE INVENTION

Therefore, an object of the present invention is to provide an addition reaction type organopolysiloxane composition and its gel cured product whose curing properties are not injured by solder fluxes or the like and which can attain the intended purpose effectively as a protective or insulating material for IC and wirings.

The present invention has succeeded in attaining the above object by using, as a base polymer, an organopolysiloxane which has a siloxane unit with an aliphatic unsaturated group in a certain proportion at the end of the molecule.

According to the present invention, there is provided an organopolysiloxane composition, comprising (A) an organopolysiloxane in which 5 to 30 mol % of the molecule ends is made up of an $(R^1)_3SiO_{0.5}$ unit and 95 to 70 mol % of the molecule ends is made up of at least one unit selected from the group consisting of an $R^1(R^2)_2SiO_{0.5}$ unit, an $(R^1)_2R^2SiO_{0.5}$ unit, and an $(R^2)_3SiO_{0.5}$ unit, in which units $R^1$ represents an aliphatic unsaturated group and $R^2$ represents a monovalent unsubstituted or substituted hydrocarbon group free of aliphatic unsaturated groups, (B) an organohydrogenpolysiloxane having two or more Si—H-groups on average in the molecule, and (C) an addition reaction catalyst, wherein said organohydrogenpolysiloxane (B) is contained in such an amount that the amount of the Si—H-groups contained therein is 0.5 to 3 mol per mol of the aliphatic unsaturated group contained in said organopolysiloxane (A).

Also, according to the present invention there is provided a gel cured product obtained by curing the above composition.

According to the present organopolysiloxane composition, a gel cured product high in resistance to poisoning by solder fluxes can be obtained. Accordingly, by forming this gel cured product on the surface, for example, of various electrical and electronic parts and semiconductor devices, the covering and sealing can be done effectively and it has become possible to effectively solve soiling and defective contact of parts due to hampering of curing by solder fluxes.

DETAILED DESCRIPTION OF THE INVENTION

(A) Organopolysiloxanes

The average composition formula of the organopolysiloxane (A) used in the present invention is represented, for example, by the following formula [I]:

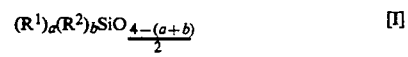

$$(R^1)_a(R^2)_b SiO_{\frac{4-(a+b)}{2}} \quad [I]$$

wherein $R^1$ represents the above-mentioned aliphatic unsaturated group, $R^2$ represents the above-mentioned monovalent unsubstituted or substituted hydrocarbon group containing no aliphatic unsaturated groups, a is a number with $0<a<3$ and b is a number with $0<b<3$, provided that $0<a+b<4$.

In the organopolysiloxane having the average composition formula [I] in the present invention, 5 to 30 mol % of the molecule ends of it is made up of an $(R^1)_3SiO_{0.5}$ unit and 95 to 70 mol % of the molecule ends is made up of at least one unit selected from the group consisting of an $R^1(R^2)_2SiO_{0.5}$ unit, an $(R^1)_2R^2SiO_{0.5}$ unit, and an $(R^2)_3SiO_{0.5}$ unit. That is, the ends of the organopolysiloxane (A) are blocked with these units.

Generally, it is considered that hampering of curing by solder fluxes is caused by the happening of the reaction between the Si—H group in the organohydrogenpolysiloxane which takes part in the crosslinking reaction and the carboxyl group in the abietic acid that is a major component of a solder flux. Thus, according to the present invention, due to the presence of an aliphatic unsaturated group, which is the crosslinking functional group of the organopolysiloxane, at the molecule end, the curing speed increases and as a result the above reaction between the Si—H group and the abietic acid is effectively suppressed, so that hampering of curing by solder fluxes has successfully been obviated. Particularly, the $(R^1)_3SiO_{0.5}$ unit present at the molecule end is the most important factor of improving the flux resistance of the present composition and if the amount of the unit is less than 5%, hampering of curing by solder fluxes will occur while if the amount is more than 30 mol %, the gel cured product that will be obtained becomes too hard to function as a gel and is disadvantageous to prevent hampering of curing by solder fluxes. The other units present at the molecule ends, that is, the $R^1(R^2)_2SiO_{0.5}$ unit, the $(R^1)_2R^2SiO_{0.5}$ unit, and the $(R^2)_3SiO_{0.5}$ unit control the softness of the silicon gel after curing.

Examples of the above aliphatic unsaturated group $R^1$ include an alkenyl group having 2 to 8 carbon atoms such as a vinyl group, an allyl group, an isopropenyl group, a butenyl group, and a hexenyl group and most preferably the above aliphatic unsaturated group $R^1$ is a vinyl group. These aliphatic unsaturated groups represented by $R^1$ may be bonded to silicon atoms in the molecular chain so long as the proportion of the aliphatic unsaturated groups present at the molecule ends falls in the above range.

Suitable examples of the monovalent unsubstituted or substituted hydrocarbon group $R^2$ free of aliphatic unsaturated groups include groups having 1 to 20, preferably 1 to 10, carbon atoms, for example, an alkyl group such as a methyl group, an ethyl group, a propyl group, an isopropyl group, a butyl group, a pentyl group, a hexyl group, an octyl group, a decyl group, and a dodecyl group; a cycloalkyl group such as a cyclopentyl group, a cyclohexyl group, and a cyclobutyl group; an aryl group such as a phenyl group, a tolyl group, a xylyl group, and a naphthyl group; an aralkyl group such as a benzyl group, a phenylethyl group, and a phenylpropyl group; and a group formed by replacing part or all of the hydrogen atoms of these hydrocarbon groups, for example, with halogen atoms such as chlorine, fluorine, and bromine atoms or with cyano groups such as a halogenated hydrocarbon group including a chloromethyl group, a trifluoropropyl group, a chlorophenyl group, a dibromophenyl group, a tetrachlorophenyl group, and a difluorophenyl group, and a cyano alkyl group including a $\beta$- cyanoethyl group, a $\gamma$-cyanopropyl group, and a $\beta$-cyanopropyl group. In the present invention the group $R^2$ is most preferably a methyl group because, in that case, the synthesis is easy and the heat resistance and physical properties of the gel cured produce that will be obtained become preferable.

The organopolysiloxane that is the component (A) used in the present invention may be a linear or branched organopolysiloxane or a mixture of linear organopolysiloxane and a branched organopolysiloxane. A branched organopolysiloxane is preferable in order to form a gel cured product that is required to be resistant to cold.

Where the composition of the present invention is used, for example, in injection, potting, coating, impregnation, and bonding, the composition itself is required to have suitable flowability and to have suitable physical properties even before it is cured. From this point of view, preferably the viscosity of the above organopolysiloxane (A) at 25° C. falls in the range of 50 to 100,000 cP. Further, in the above average composition formula [I], a and b are required to satisfy $0<a<3$, $0<b<3$, and $0<a+b<4$, and the values of a and b are set so that the viscosity may be most suitable for the particular application in the above viscosity range.

The above-mentioned organopolysiloxane can be produced by a method known per se.

(B) Organohydrogenpolysiloxanes

The organohydrogenpolysiloxane (B) used in the present invention has two or more Si—H groups (i.e., hydrogen atoms bonded to silicon atoms) on average in the molecule and the Si—H group undergoes an addition reaction with the aliphatic unsaturated group in the above organopolysiloxane (A) to form a gel cured product. That is, the organohydrogenpolysiloxane (B) acts as a crosslinking agent. Such a Si—H group may be present at the end of the molecule or in the molecule.

The organohydrogenpolysiloxane (B) is represented, for example, by the following average composition formula [II]:

wherein c is a number with $0<c<3$ and d is a number with $0<d\leq2$, provided that $1\leq c+d\leq3$, and $R^3$ represents a substituted or unsubstituted hydrocarbon group free of aliphatic unsaturated groups. In said average composition formula [II], specific examples of the hydrocarbon group $R^3$ include those exemplified for the hydrocarbon group $R^2$ of the above average composition formula [I].

In the organohydrogenpolysiloxane, although the siloxane skeleton may be linear, cyclic, or branched, or it may be resinous, if the composition is used where cold resistance is required, preferably the siloxane skeleton is branched. If a certain strength is required, preferably it is a resinous one soluble in a nonpolar solvent. Further, although there is no particular restriction on the viscosity at 25° C., preferably the viscosity is in the range of 10 to 1,000 cP in view of easiness of the synthesis and workability.

In the present invention, the amount of the organohydrogenpolysiloxane (B) to be blended is such that the amount of the Si—H group is 0.5 to 3 mol, preferably 0.6 to 1 mol, per mol of the aliphatic unsaturated group in said organopolysiloxane (A). If the amount of the Si—H group, that is, the hydrogen atom bonded to a silicon atom is smaller than the above range, the aliphatic unsaturated group remains in the gel cured product to lower the heat resistance, while the amount is larger than the above range, the heat resistance is also lowered and there is a risk that foaming will occur when curing is effected.

(C) Addition Reaction Catalysts

The addition reaction catalyst used in the present invention is any catalyst that can promote the addition reaction between the aliphatic unsaturated group of the component (A) and the hydrosilyl group (Si—H group) of the component (B) and, for example, chloroplatinic acid, an alcohol-modified chloroplatinic acid, the coodination compound of chloroplatinic acid with an olefin or vinylsiloxane or an acetylene compound, tetrakis(triphenylphosphine)palladium, or chlorotris(triphenylphosphine)rhodium can be used with a platinum catalyst being particularly preferred.

The catalyst is generally blended in an amount of 0.1 to 1,000 ppm based on the sum of the components (A) and (B).

Other Ingredients

In the present organopolysiloxane composition, other than the above components (A) to (C), various ingredients known per se can be added.

For example, an inorganic filler such as fumed silica, silica aerosil, precipitated silica, ground silica, diatomaceous earth, iron oxide, zinc oxide, titanium oxide, calcium carbonate, magnesium carbonate, zinc carbonate, and carbon black may be added, so that the hardness, mechanical strength, etc. of the gel cured product obtained from the present composition can be adjusted. Of course, for example, a hollow inorganic filler, a hollow organic filler, an organosilicone resin, or a rubbery spherical filler may be added. Also, a reaction retarding agent such as a polymethylvinylsiloxane cyclic compound, an acetylene compound, and an organophosphorus compound may be added to control the curing reaction. These ingredients are used in arbitrary amounts so long as they do not injure the properties of the obtained gel cured product.

Formation of the Gel Cured Product

When the present organopolysiloxane compound comprising the above components is cured, a gel cured product high in resistance to poisoning by solder fluxes can be formed.

In this specification, the term "a gel cured product" means a cured silicone product which has a penetration of 200 or below when measured according to ASTM D-1403 (¼ Scale Cone). The gel cured product generally has partially a three-dimensional network, and can be deformed or fluidized under the influence of stress.

The formation of a gel cured product is carried out in a conventionally known manner, for example, by pouring the present addition curing type organopolysiloxane composition into a suitable mold and curing the composition, or by coating a suitable substrate with the composition and curing the composition. The curing can easily be carried out generally by heat treatment at a temperature of 60° to 150° C. for about 30 to 180 min.

EXAMPLES

The present invention will now be described with reference to the following examples. In the examples, Me and Vi stand for a methyl group and a vinyl group respectively, the viscosity was measured at 25° C., and parts quoted are all by weight.

COMPARATIVE EXAMPLE 1

100 parts of a dimethylpolysiloxane (viscosity: 800 cP) containing 30 mol % of a ViMe$_2$SiO$_{0.5}$ unit and 70 mol % a Me$_3$SiO$_{0.5}$ unit as the molecule end groups, 25 parts of a dimethylpolysiloxane which has a trimethylsilyl group at the ends (viscosity: 1,000 cP), 0.02 part of phenylmethylvinylsiloxane, and 0.7 part of a methylhydrogenpolysiloxane (viscosity: 90 cP) made up of 62 mol % of an Me$_2$SiO unit, 35 mol % of an HMeSiO unit, and 3 mol % of an Me$_3$SiO$_{0.5}$ unit were mixed uniformly, then a vinylsiloxane complex of chloroplatinic acid was added in an amount of 5 ppm in terms of platinum based on the total amount, and they were mixed uniformly to prepare Composition (a).

With this Composition (a), was mixed uniformly a flux solution diluted with toluene to have a content of 10%, in an amount of 600 ppm in terms of flux. This mixture was heated at 150° C. for 30 min and the penetration of the thus obtained cured produce was measured in accordance with ASTM D-1403 (¼ Scale Cone). Also the penetration of a cured product obtained similarly but without the addition of the flux was measured. The results of the measurement are shown in Table 1.

EXAMPLE 1

100 parts of a dimethylpolysiloxane (viscosity: 1,000 cP) containing 5 mol % of a Vi$_3$SiO$_{0.5}$ unit, 23 mol % of a ViMe$_2$SiO$_{0.5}$ unit, and 72 mol % of an Me$_3$SiO$_{0.5}$ unit as the molecule end groups, 0.02 part of phenylmethylvinylsiloxane, and 0.65 part of a methylhydrogenpolysiloxane made up of 32 mol % of an Me$_2$SiO unit, 62 mol % of an HMeSiO unit, and 6 mol % of an Me$_3$SiO$_{0.5}$ unit were mixed uniformly, then a vinylsiloxane complex of chloroplatinic acid was added in an amount of 5 ppm in terms of platinum based on the total amount, and they were mixed uniformly to prepare Composition (b).

From this Composition (b), cured products were formed in the same way as that in Comparative Example 1 and the penetration was measured. The results of the measurement are given in Table 1.

EXAMPLE 2

Comparative Example 1 was repeated, except that 100 parts of a dimethylpolysiloxane (viscosity: 1,000 cP) containing 8 mol % of a Vi$_3$SiO$_{0.5}$ unit, 17 mol % of a ViMe$_2$SiO$_{0.5}$ unit, and 75 mol % of an Me$_3$SiO$_{0.5}$ unit as the molecule end groups and 0.8 part of a methylhydrogenpolysiloxane which was the same as that used in Example 1, thereby preparing a Composition (c). The penetration of its cured products were measured and the results of the measurement are given in Table 1.

EXAMPLE 3

Example 1 was repeated, except that 100 parts of a dimethylpolysiloxane (viscosity: 1,000 cP) containing 10 mol % of a Vi$_3$SiO$_{0.5}$ unit, 15 mol % of a ViMe$_2$SiO$_{0.5}$ unit, and 75 mol % of an Me$_3$SiO$_{0.5}$ unit as molecule end group and 0.92 part of a methylhydrogenpolysiloxane (viscosity: 12 cP) made up of 49 mol % of an Me$_2$SiO unit, 39 mol % of an HMeSiO unit, and 12 mol % of an Me$_3$SiO$_{0.5}$ unit, thereby preparing a Composition (d). The penetration of its cured products were measured and the results of the measurement are given in Table 1.

TABLE 1

| Composition | Penetration | |
|---|---|---|
| | A flux was not added | A flux was added |
| (a) Comparative Example 1 | 115 | Flowed |
| (b) Example 1 | 120 | 165 |
| (c) Example 2 | 118 | 130 |
| (d) Example 3 | 121 | 131 |

From the results shown above, it can be understood that the gel cured products obtained from Compositions (b) to (d) of Examples 1 to 3 have high resistance to poisoning by a flux in comparison with the gel cured product obtained from Composition (a) of Comparative Example 1.

I claim:

1. An organopolysiloxane composition, comprising
(A) a linear or branched organopolysiloxane or mixture thereof in which 5 to 10 mol % of the molecule ends is made up of an (R$^1$)$_3$SiO$_{0.5}$ unit and 95 to 90 mol % of the molecule ends is made up of at least one unit selected from the group consisting of an R$^1$(R$^2$)$_2$SiO$_{0.5}$ unit, an (R$^1$)$_2$R$^2$SiO$_{0.5}$ unit, and an (R$^2$)$_3$SiO$_{0.5}$ unit, in which units R$^1$ represents an aliphatic unsaturated group and R$^2$ represents a monovalent unsubstituted or substituted hydrocarbon group free of aliphatic unsaturated groups,
(B) an organohydrogenpolysiloxane having two or more Si—H-groups on average in the molecule, and
(C) an addition reaction catalyst, wherein said organohydrogenpolysiloxane (B) is contained in such an amount that the amount of the Si—H-groups contained therein is 0.5 to 3 mol per mol of the aliphatic unsaturated group contained in said organopolysiloxane (A).

2. An organopolysiloxane composition as claimed in claim 1, wherein the aliphatic unsaturated group $R^1$ in said organopolysiloxane (A) has 2 to 8 carbon atoms.

3. An organopolysiloxane composition as claimed in claim 2, wherein said aliphatic unsaturated group $R^1$ is a vinyl group.

4. An organopolysiloxane composition as claimed in claim 2, wherein the unsubstituted or substituted hydrocarbon group $R^2$ in said organopolysiloxane (A) has 1 to 20 carbon atoms.

5. An organopolysiloxane composition as claimed in claim 1, wherein said organopolysiloxane (A) is represented by the following average composition formula:

$$(R^1)_a(R^2)_b SiO_{\frac{4-(a+b)}{2}}$$

wherein $R^1$ and $R^2$ have the meanings defined in claim 1 and a is a number with $0<a<3$ and b is a number with $0<b<3$, provided that $0<a+b<4$.

6. An organopolysiloxane composition as claimed in claim 1, wherein said organopolysiloxane (A) has a viscosity in the range of 50 to 100,000 cP at 25° C.

7. An organopolysiloxane composition as claimed in claim 1, wherein said organohydrogenpolysiloxane (B) is represented by the following average composition formula:

$$R_c^3 H_d SiO_{\frac{4-(c+d)}{2}}$$

wherein $R^3$ represents a monovalent substituted or unsubstituted hydrocarbon group free of aliphatic unsaturated groups, c is a number with $0<c<3$ and d is a number with $0<d\leq 2$, provided that $1\leq c+d\leq 3$.

8. An organopolysiloxane composition as claimed in claim 7, wherein the unsubstituted or substituted hydrocarbon group $R^3$ in said organohydrogenpolysiloxane (B) has 1 to 20 carbon atoms.

9. A gel cured product obtained by curing an organopolysiloxane composition as claimed in claim 1.